United States Patent Office 2,743,341
Patented Apr. 24, 1956

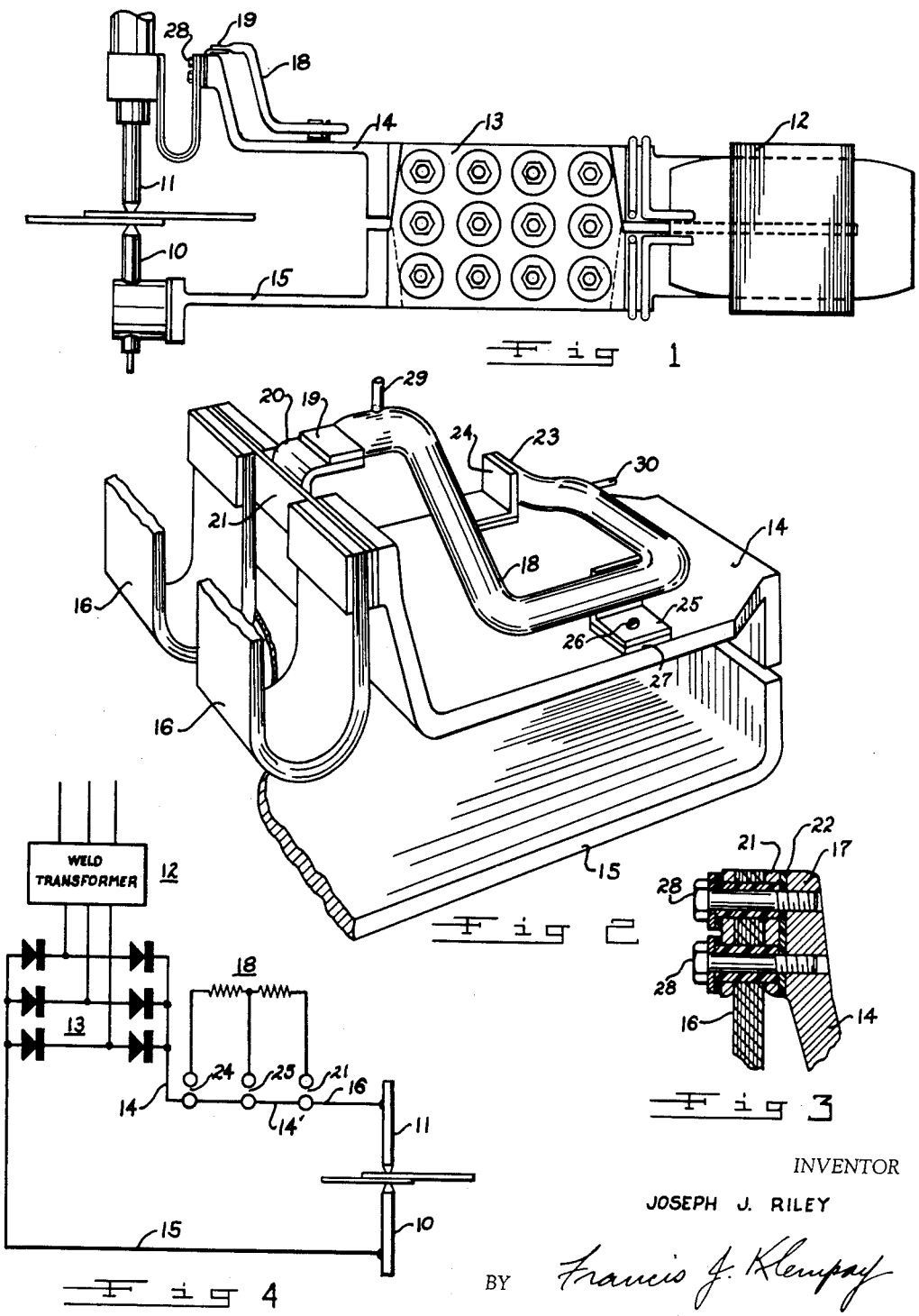

2,743,341
RECTIFIER WELDER APPARATUS

Joseph J. Riley, Warren, Ohio, assignor to The Taylor-Winfield Corporation, Warren, Ohio, a corporation of Ohio Application January 19, 1953, Serial No. 331,810

5 Claims. (Cl. 219—4)

The present invention relates to electric resistance welding apparatus, and more particularly to improvements in resistance welding apparatus of the type utilizing a rectifier power supply, the improvements having the effect of increasing the performance range of a given rectifier welding device, stabilizing welding performance, and increasing the useful operating life of the apparatus, all in relation to similar apparatus as heretofore known and constructed.

More specifically, it is an object of the present invention to provide a rectifier welding apparatus of improved construction which is characterized by its ability to perform a series of welds in a more stabilized and regulated manner than has been heretofore possible, particularly in regard to the initial welding operations of a series thereof wherein the welding apparatus is seeking equilibrium or normal operating temperatures and conditions. It is a well-known characteristic of rectifier devices particularly of the magnesium-copper sulphide type that the internal resistance thereof decreases with increases in temperature. This factor can have substantial adverse effects on the character of welds produced in rectifier welding apparatus since ordinarily the resistance of the rectifier unit comprises a substantial part of the resistance of the entire welding circuit, including the pieces to be welded, so that for a predetermined input voltage welding current varies in close relation to variations in rectifier resistance as the same seeks temperature equilibrium. I have greatly overcome this factor in my present invention by providing for the selective use in the welding circuit of a member of substantial resistance and of positive temperature-resistance coefficient, that is, a resistance member which will increase in resistance with increasing temperatures whereby to substantially offset the decreasing resistance of the rectifier device and maintain substantial uniformity in the electrical characteristics of the welding circuit.

Another object of the invention is the provision in a rectifier welding machine of a selectively usable resistance member in the secondary or welding circuit of the machine whereby the machine may be advantageously utilized for welding various types of metals having widely differing electrical characteristics, as for example, aluminum and stainless steel.

It is desirable, whenever possible, to operate a rectifier device of the type herein contemplated at maximum rated input voltage since otherwise the rectifier cells, which may be of magnesium-copper sulphide composition, for example, tend to progressively "de-age" or lose their ability to rectify an impressed alternating voltage with practicable commercial efficiency. This effect is more pronounced when input voltage is less than a predetermined amount. Accordingly, the present invention seeks to provide an improved arrangement whereby resistance welding apparatus of the type employing a dry disc rectifier may be operated at a predetermined rated input voltage under various operating conditions wherein the output or electrode voltage may in some cases be substantially less than a rated amount. This feature is of particular value if the welding apparatus is to be employed at different times for welding both stainless steel, requiring a relatively low welding current, and aluminum, requiring a high welding current.

Another object of the present invention is the provision in a rectifier welding machine of means for varying the resistance of the secondary or welding circuit of the apparatus independently of the resistance of the material to be welded so that the secondary circuit characteristics of the apparatus may be maintained relatively constant under substantially diverse operating conditions, providing for a maximum effective range of control over the input of welding energy into the apparatus. Thus, conventional electric resistance welding machines are often provided with welding transformers having a plurality of taps at the primary coil whereby the turns ratio of the transformer may be readily varied to suit the welding conditions and requirements. And by the teachings of my invention I may set up a welding machine for operation under various diverse conditions while at all times providing for a nominal transformer setting at or near its middle tap so that a maximum of adjustment to either side of such nominal setting is at all times afforded.

Yet another object of the invention is the provision of rectifier welding apparatus having the characteristics and advantages set forth above which is in addition of relatively simple construction, requiring an absolute minimum of additional equipment as compared to conventional rectifier welding apparatus not having the advantages obtainable through the teachings of the present invention.

The above and other objects and advantages of the invention will become apparent upon full consideration of the following detailed specification and accompanying drawing wherein is disclosed a preferred embodiment of the invention.

In the drawing:

Figure 1 is a simplified overall view of a resistance welding machine of the type having a dry disc rectifier and embodying the teachings of my invention;

Figure 2 is an enlarged perspective view of a portion of the secondary or welding circuit of the apparatus of Figure 1 illustrating details of construction constituting the improvement of my invention;

Figure 3 is a fragmentary section view taken generally along a vertical plane through Figure 2; and Figure 4 is a simplified schematic electrical diagram of the circuitry employed in the apparatus of Figure 1.

Referring now to the drawing, and initially to Figure 1 thereof, there is shown a welding machine comprising a pair of welding electrodes 10 and 11, and an energy supply therefor including a suitable welding transformer 12 and a dry disc rectifier device 13. The energy supply may be of an improved type as disclosed in U. S. Patent No. 2,601,240 to R. H. Blair, for example.

Connecting the output terminals of the rectifier device 13 is a pair of heavy duty conductors or bus bars 14 and 15, the lower one of the conductors being connected rigidly to the lower electrode 10 while the upper conductor 14 connects the upper electrode 11 through an interposed flexible conductor 16 of laminated copper, for example, all in accordance with heretofore known welder construction. Also, it is conventional to provide the upper electrode 11 with suitable means, not shown, for effecting vertical movement of the electrode and for applying welding pressure between the electrodes as will be understood.

In the usual welder construction practices one or more flexible conductors 16 are bolted or otherwise secured directly to flat terminal pads 17 of the upper conductor 14 so that a direct electrical connection is afforded between the conductors 14 and 17. However, in accordance with the teachings of my invention I provide for the variable and selective interposition of a resistance member between the conductors 14 and 16 for the above mentioned purposes of stabilizing welder performance by compensating for the usual negative temperature-resistance coefficient of the rectifying device 13, providing for a wider range of energy adjustment under varying operating conditions by maintaining the secondary circuit characteristics of the apparatus relatively constant, and preventing "de-aging" of the rectifier 13 by operating the same, insofar as possible, at rated input voltage. In the present embodiment of the invention this resistance member comprises a copper tube 18 of selected length and cross sectional area and having a resistance value which may be approximately equal to the internal resistance of the rectifying device 13 under average operating conditions.

As shown in Figure 2 of the drawing, the resistance member 18 is flattened at its forward end 19 and is connected, for example by brazing, to an L-shaped conductor member 20 which is in turn brazed or otherwise connected to a transversely disposed conductor 21. The conductor 21 extends outwardly of each side of the L-shaped conductor member 20 into overlying relation with each of a pair of flexible conductors 16, the conductor 21 being positioned between terminal pad 17 and the conductors 16 as shown in Figure 3. Also, as shown in Figure 3, an insulating member 22 is interposed between the terminal pad 17 and conductor member 21 whereby to prevent direct conduction of current between the pad 17 and conductor 16.

At its other end extremity 23 the resistance member 18 is flattened and secured to a second L-shaped conductor 24 which is in turn secured to the main conductor 14. The arrangement is such that welding energy flowing to welding electrodes 10 and 11 is caused to pass through the resistance member 18 so that operation of the welding apparatus may be controlled in accordance with the teachings of the invention.

Secured to the resistance member 18 intermediate the ends 19 and 23 thereof and in conducting relation thereto is a third L-shaped conductor member 25 which is in turn removably secured to the main conductor 14 by means of a suitable bolt 26, for example. Interposed between the lower surface of the conductor member 25 and the main conductor 14 is an insulating member 27 which, when positioned as described, maintains the conductors 25 and 14 in electrically isolated relation. And it is of course understood that suitable insulation is provided about the bolt 26 so that there is no transfer of current therethrough from conductor 14 to the L-shaped member 25.

According to the teachings of the invention the insulating member 27 is removable at the will of the machine operator so that, when desired, that portion of the resistance member 18 between the L-shaped conductors 24 and 25 may be effectively shorted out of the welding circuit to change the characteristics thereof as may be desired. Any number of intermediate connectors, such as member 25, may be provided along the resistance member 18 without departing from the teachings of this invention as will be readily appreciated.

In the schematic electrical diagram of Figure 4 the resistance member 18 is shown to have three taps 21, 24 and 25, corresponding to the connector members previously described. And the main conductor 14 is shown, for purposes of illustration, to have a removable jumper portion 14' which, upon removal of the same will cause welding current to flow through the resistor 18 or a portion thereof depending upon the manner in which the resistor 18 is connected into the circuit.

In the contemplated use of my invention the welding machine, exclusive of the resistor member 18 and appurtenant elements, may be designed for welding aluminum, for example, which requires a high welding current and which accordingly requires the normal use of a relatively high input voltage at the rectifier 13, as is desired. However, for welding material such as stainless steel a much lower welding current is desired, and accordingly a lower electrode voltage is in order. Thus, in accordance with the teachings of my invention, I may in such instances arrange for the passage of welding current through the resistance member 18 so that even though the required low voltage is applied at the electrodes 10 and 11, a substantially greater voltage is applied to the input terminals of the rectifier 13, the excess voltage being dropped across the ressistance 18 as will be understood. In the illustrated embodiment of the invention either the full resistance or only a portion thereof may be interposed in the welding circuit as may be desired in view of the nature and/or thickness of the work to be welded.

Where, as in the welding of aluminum for example, it is desirable to operate the welding apparatus entirely without the use of external resistance in the secondary circuit it is merely necessary to remove bolts 28, mounting flexible conductors 16 to pad 17, and remove the insulating strip 22 whereby a direct connection is afforded between the pad 17 and conductors 16. The resistance member 18 is thereby effectively shunted out of the welding circuit and is without effect thereon.

It will be readily understood, of course, that the use of resistance member 18 in the welding circuit as described will be accompanied by the generation of substantial amounts of heat internally of the member 18. To remove this heat I have provided inlet and outlet connections 29 and 30 for cooling fluid, which connections are positioned adjacent the ends of the member 18 whereby to provide for the flow of cooling fluid substantially throughout the entire length thereof. The member 18, being comprised of a length of tubular copper, is inherently provided with an internal passage connecting the inlet and outlet connections 29 and 30 as will be understood.

Welding apparatus according to my present invention finds particularly advantageous use in the spot welding of stainless steel, for example, especially if the rate or frequency of welding may vary from time to time. Thus, where are frequency of welding is relatively high the welding apparatus operates at a higher "equilibrim" temperature than when welding at lower frequencies, and under ordinary circumstances it might be expected that there would be material changes in welding results due to temperature-caused changes in the electrical characteristics of the welding apparatus. However, by the teachings of my invention such changes in electrical characteristics may be caused to be mutually compensating, or substantially so, whereby the welding results obtainable may be as consistent as possible notwithstanding substantial variations in the rate of production.

Another important advantage of the invention resides in the fact that the same welding apparatus, as constructed in accordance with the invention, may be effectively utilized for welding such diverse materials as aluminum and stainless steel without sacrifice in the useful operating life of the rectifier device, and without limiting the range of energy adjustment as may be provided by a welding transformer having a multi-tap primary winding. Thus, substantially regardless of the nature of the material to be welded the welding transformer may be set at an intermediate tap, affording a wide range of adjustment to either side thereof. And under all operating conditions the rectifying device may be operated at near-optimum voltage values whereby to materially reduce deterioration or "de-aging" of magnesium-copper sulphide or other dry disc type rectifying elements.

The practice of my present invention requires equipment of utmost simplicity, in addition to the conventional welding equipment, as will be readily apparent. Thus, the use of a resistance member 18 of copper tubing having a preselected length and cross sectional area provides a member which, in addition to having the desirable electrical characteristics, is inherently provided with a passage for cooling water and is readily installed on the conventional welding apparatus, as well as readily tailored to suit conventional apparatus of various sizes and electrical capacities.

Having thus fully disclosed and described a preferred embodiment of my invention and explained its various advantages, what I claim as new and desire to secure by Letters Patent is:

1. In an electric resistance welding machine of the type having a pair of electrodes, a welding transformer, a dry disc rectifying device, and conductor means connecting said electrodes with said rectifying device; the improvement comprising a resistance member adapted for selective interposition in series in said conductor means, said resistance member comprising copper tubing of preselected length and cross sectional area and thereby having a total resistance of predetermined magnitude, said tubing being connected at a first point with said conductor means and at a second point with one of said electrodes, and insulating means adapted to be selectively interposed between said conductor means and said one of said electrodes.

2. Apparatus according to claim 1 further including means for shorting out a predetermined length of said copper tubing whereby the effective series resistance thereof may be varied.

3. In electrical apparatus of the kind having a load circuit and employing a dry disc rectifying device and a source of alternating current energy for supplying direct current energy to said load circuit, said rectifying device being characterized by having a negative temperature-resistance coefficient; the improvment which comprises a resistance member adapted for selective interposition in series in said load circuit and having a resistance value approximately equal to the resistance of said rectifying device operating under average load conditions, said resistance member having a positive temperature-resistance coefficient whereby to at least partially compensate for resistance changes in said rectifying device caused by changes in temperature in said apparatus, said resistance member comprising a selected length of copper tubing of predeterminal cross sectional area, and said tubing being provided at spaced points with inlet and outlet connections for cooling fluid.

4. Apparatus according to claim 3 further characterized by said tubing being connected at one end with said load and at its other end with said rectifying device, and said apparatus including low resistance means for selectively shorting said tubing or a portion of the linear extent thereof.

5. In an electric resistance welding machine of the type having a pair of electrodes, a welding transformer, a dry disc rectifying device, and conductor means connecting said electrodes with said rectifying device; the improvement comprising a resistance member adapted for selective interposition in series in said conductor means, said resistance member comprising a member of preselected length and cross sectional area thereby having a total resistance of predetermined magnitude, said resistance member being connected at a first point with said conductor means and at a second point with one of said electrodes, and insulating means to be selectively interposed between said conductor means and said one of said electrodes.

References Cited in the file of this patent
UNITED STATES PATENTS

| | | |
|---|---|---|
| 1,094,732 | Lyle | Apr. 28, 1914 |
| 1,751,359 | Ruben | Mar. 18, 1930 |
| 2,030,906 | Malley | Feb. 18, 1936 |
| 2,175,841 | Kafka et al. | Oct. 10, 1939 |
| 2,221,576 | Dawson | Nov. 12, 1940 |